(12) United States Patent
Stradley

(10) Patent No.: US 6,392,651 B1
(45) Date of Patent: *May 21, 2002

(54) INTERACTIVE TIMELINE VISUALIZATION

(75) Inventor: David J. Stradley, Madison, AL (US)

(73) Assignee: Intergraph Corporation, Huntsville, AL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,629

(22) Filed: Apr. 3, 1998

Related U.S. Application Data

(60) Provisional application No. 60/041,804, filed on Apr. 3, 1997.

(51) Int. Cl.[7] ................................................ G06T 13/00
(52) U.S. Cl. ....................................... 345/473; 345/474
(58) Field of Search ................................ 345/302, 355, 345/328, 473, 474

(56) References Cited

U.S. PATENT DOCUMENTS

| | | | |
|---|---|---|---|
| 5,148,154 A | 9/1992 | MacKay et al. | 340/712 |
| 5,303,388 A | 4/1994 | Kreitman et al. | 395/159 |
| 5,621,874 A | 4/1997 | Lucas et al. | 395/761 |
| 5,621,906 A | 4/1997 | O'Neill et al. | 395/355 |
| 5,781,188 A * | 7/1998 | Amiot et al. | 345/302 |
| 5,826,102 A * | 10/1998 | Escobar et al. | 345/302 |
| 5,838,938 A * | 11/1998 | Morgan | 345/302 |
| 6,023,703 A * | 2/2000 | Hill | 707/100 |
| 6,058,397 A * | 5/2000 | Barrus et al. | 707/104 |
| 6,061,067 A * | 5/2000 | Silva | 345/433 |

OTHER PUBLICATIONS

Ping–Kang Ksiung, et al., "T–Buffer: Fast Visualization of Relativistic Effects in Spacetime," 1990 Symposium on Interactive 3D Graphics, Snowbird, UT, USA, 25–28, Mar. 1990., USA.

Scheider, B., et al., "Brush as a Walkthrough System for Architectural Models," Photorealistic Rendering Techniques, Proceedings Fifth Eurographics Workshop on Photorealistic Rendering Techniques, Darmstadt, Germany, Jun. 13–15, 1994, pp. 401–409, 440–441, XP002074012, ISBN 30540–58475–7, 1995, Berlin, Germany, Springer–Verlag, Germany.

* cited by examiner

*Primary Examiner*—Michael Razavi
*Assistant Examiner*—Motilewa Good-Johnson
(74) *Attorney, Agent, or Firm*—Bromberg & Sunstein LLP

(57) ABSTRACT

A system for graphically displaying an item (having a plurality of elements) on a display device as the item appears at a preselected time in a timeline first determines which of the plurality of elements are later in the timeline than the preselected time. Once this is determined, first and second sets of elements are defined, in which the elements in the first set each have a respective associated time that is no later than the preselected time. The second set of elements, however, includes each of the elements not in the first set of elements. The number of elements in each of the first set and the second set can range from no elements to many elements. The elements in the first set are drawn on the display device in a first format, and the elements in the second set are drawn on the display device in a second format. The second format, however, graphically indicates that the elements in the second set have respective times that each are later than the preselected time. As such, the first format and second format preferably are different.

51 Claims, 7 Drawing Sheets

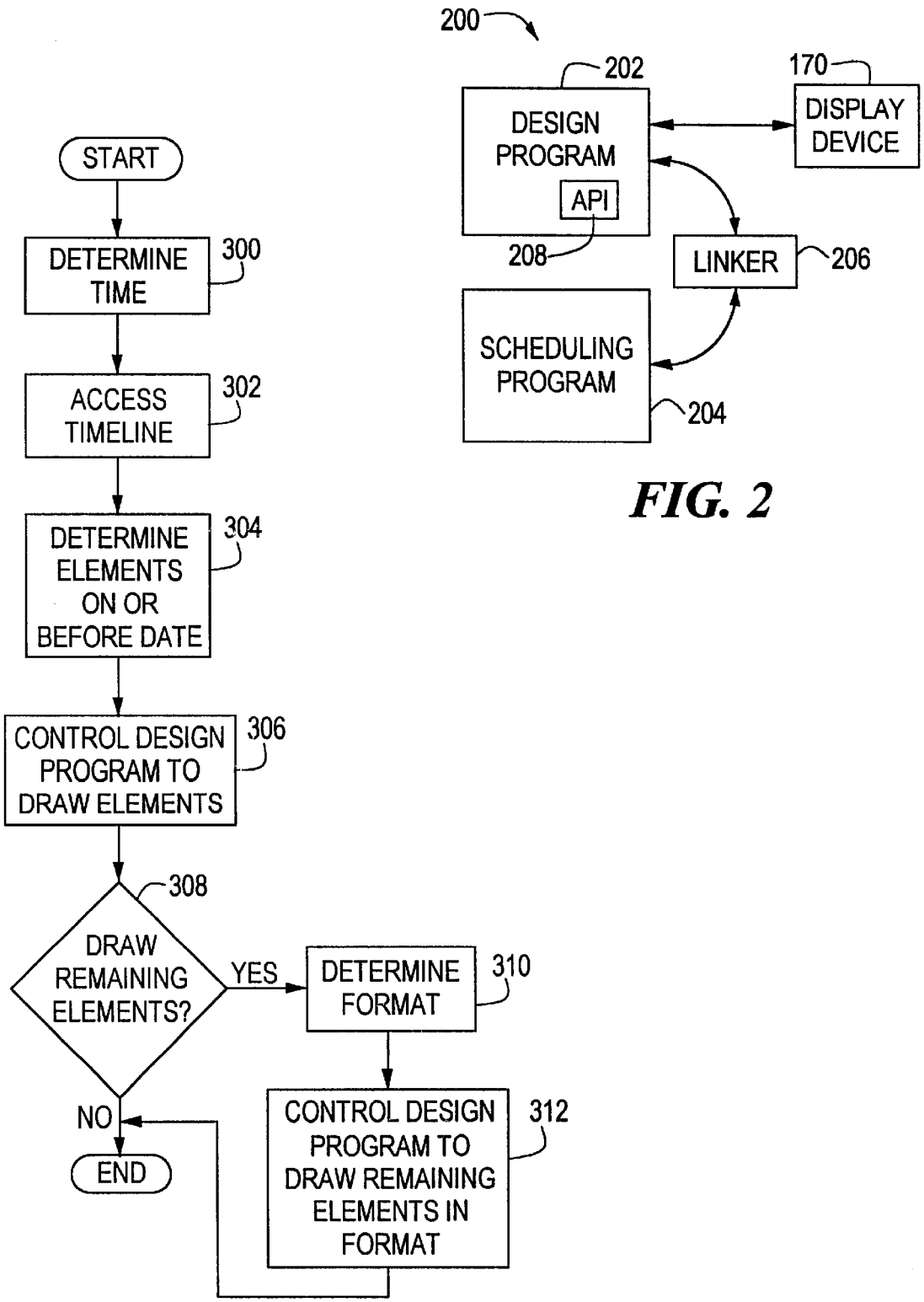

INTERACTIVE TIMELINE VISUALIZATION

PRIORITY

This application claims priority from provisional application Ser. No. 60/041,804, filed Apr. 3, 1997, entitled "INTERACTIVE TIMELINE VISUALIZATION", which is incorporated herein, in its entirety, by reference.

FIELD OF THE INVENTION

The invention generally relates to computer graphics devices and, more particularly, the to invention relates to computer based graphical design devices.

BACKGROUND OF THE INVENTION

Physical models of a large scale construction project such as, for example, a proposed power plant, commonly are built prior to the beginning of the actual construction. Among other uses, models enable designers to visually analyze the project design for potential improvements and/or flaws. Moreover, models present a physical view of the construction project to interested parties, such as investors, government land zoning boards, and project insurers.

Although useful, physical models often are bulky, expensive to produce, and are not readily changeable. Both minor and major changes to a physical model can be quite time consuming, thus delaying construction. The art has responded to some of these problems by developing computer graphical software packages that graphically display construction projects on a computer display device. A construction project thus can be displayed as a single frame, or as a predefined animation sequence of the construction process. One such package, for example, is the well known DESIGNREVIEW™ design program, available from Intergraph Corporation to Huntsville, Ala. Such packages commonly enable a designer to create a three-dimensional display of the construction project via known graphics application programming interfaces ("APIs"). One such API is the OPENGL™ API, available from Silicon Graphics, Inc. of Mountain View, Calif.

In a manner similar to physical models, conventional three dimensional graphical displays of a construction project (i.e., from single frame displays to multiple frame animation sequences) must be manually redrawn if a change is made to the design of the construction project. Like changes made to physical models, this too can be quite time consuming and consequently, delay the completion of the construction project.

SUMMARY OF THE INVENTION

In accordance with one aspect of the invention, a system for graphically displaying an item (having a plurality of elements) on a display device as the item appears at a preselected time in a timeline first determines which of the plurality of elements are later in the timeline than the preselected time. Once this is determined, first and second sets of elements are defined, in which the elements in the first set each have a respective associated time that is no later than the preselected time. The second set of elements, however, includes each of the elements not in the first set of elements. The number of elements in each of the first set and the second set can range from no elements to many elements. The elements in the first set are drawn on the display device in a first format, and the elements in the second set are drawn on the display device in a second format. The second format, however, graphically indicates that the elements in the second set have respective times that each are later than the preselected time. As such, the first format and second format preferably are different.

In other aspects of the invention, the elements in the second set are transparent or in wire frame. In a similar manner, the elements in the first set may be displayed in a first color while the elements in the second set may be displayed in a second, different color. The preselected time may be selected based upon input from a displayed user input message requesting the preselected time. In addition, the timeline may be stored in a data storage medium that is accessed to retrieve the times associated with each element.

In yet other aspects of the invention, a user viewpoint may be displayed on the display device to show the orientation of the graphical display of the item. The display may include a first window showing a first view of the item, a second window showing a second view of the item, and a third window showing a third view of the item. The first view may be a plan view, the second view may be a perspective view, and the third view may be an elevational view. In some embodiments, a document is graphically associated with at least one of the elements of the item. The document may be displayed as an icon that is graphically connected to its associated element. Selection of the icon may cause an underlying application program to execute, thus providing access to such document.

In still other aspects of the invention, each of the elements in the item may have attributes. For example, certain items may be manufactured from a certain material, such as steel. An attribute may be selected to define a third set of elements that each have the selected attribute. Each of the elements in the third set may be displayed in a third format. The third format may be configured to display the elements in the third set in a preselected color.

In other aspects of the invention, a system for displaying an item as it appears at a preselected time may include a scheduler for managing the timeline that, as suggested above, has an associated time for each element. In particular, the associated time is the time in the timeline that each such element is to be added to the item. The system further includes a designer for drawing the item in a three-dimensional space on a display device. Among other functions, the designer preferably defines the spatial relationship of each of the elements of the item. The system also includes a linker that accesses the timeline and responsively controls the designer to draw each of the elements having an associated time that is no later than a preselected time. In other embodiments, the system further includes an animator for accessing the timeline and responsively controlling the designer to draw a motion picture of the item between first and second selected times. In some embodiments, the first time is earlier than the second time. In other embodiments, the first time is later than the second time.

In some aspects of the invention, the above noted system for displaying an item utilizes the linker for controlling the displayer to draw each element having a start time that is no later than the preselected time. The start time may be the time that construction is set to being for an element. Each such element may he considered to be in a first set. The linker also may include a mechanism for adding to a second set each element in the first set having an end time that is later than the preselected time. The linker then may control the displayer to draw, in a first format, each element in the first set that is not in the second set. The displayer then may be controlled to draw each element in the second set in a second format that is different than the first format.

BRIEF DESCRIPTION OF THE DRAWINGS

The foregoing and other objects and advantages of the invention will be appreciated more fully from the following further description thereof with reference to the accompanying drawings wherein:

FIG. 2 shows a preferred embodiment of a system for displaying an item as it is to appear at a preselected date in a timeline.

FIG. 3a generally shows a preferred process utilized by a linker for controlling the system shown in FIG. 2.

DETAILED DESCRIPTION OF SPECIFIC EMBODIMENTS

Figure 1:
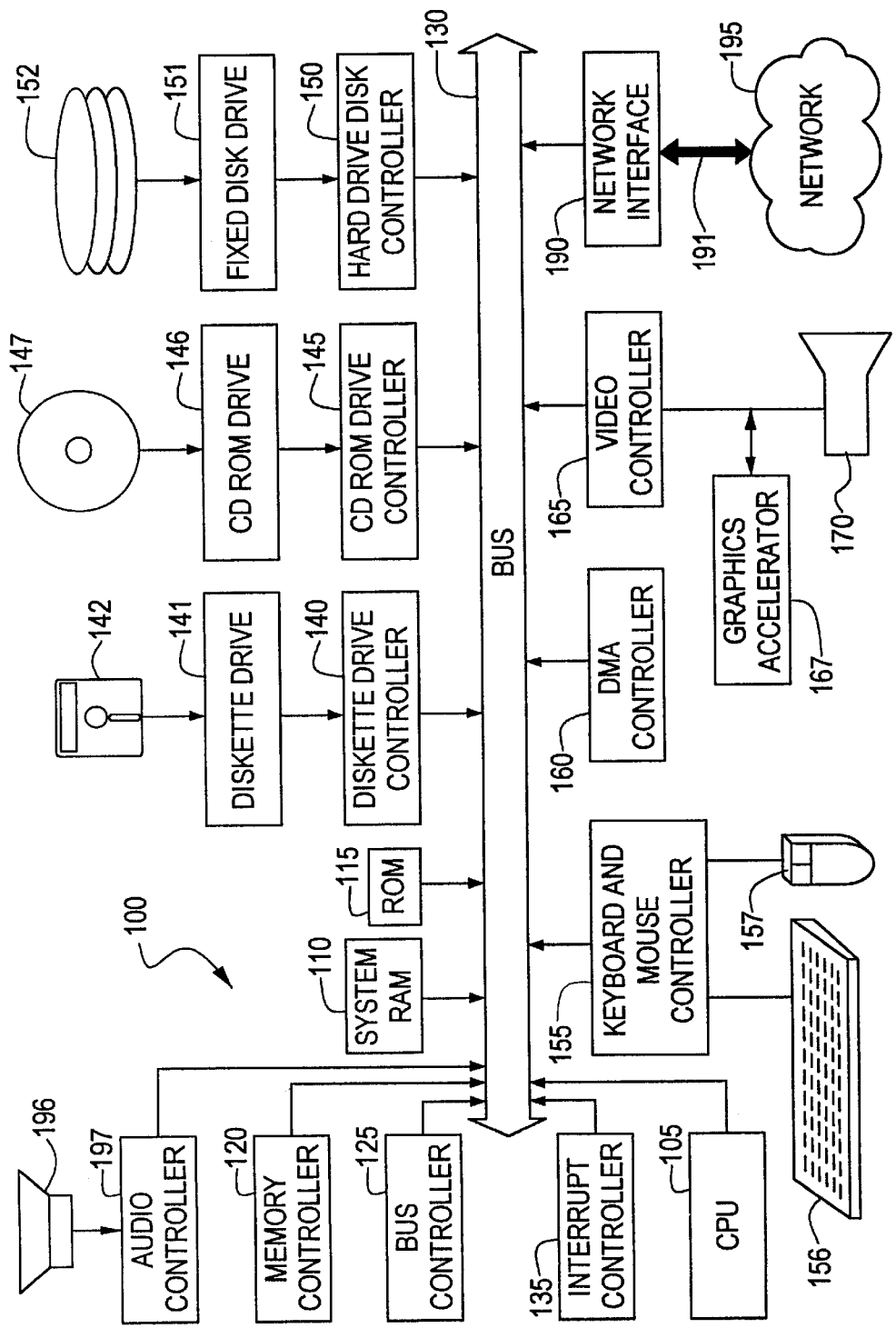
FIG. 1 illustrates the architecture for an exemplary computer system that may be utilized with a preferred embodiment of the invention.

In accordance with preferred embodiments of the invention, a computer graphic display system 200 displays an item as it is to appear at a preselected time in a predefined timeline. For example, the system 200 may display a power plant as it is to appear on its fiftieth day of construction. The timeline, which may be stored in a database on a computer system, preferably includes times (i.e., dates and/or times) that elements of the item are to appear or disappear from the item. Although the times can be in any order, it is preferred that the times be in ascending order from earlier times to later times. In some embodiments, the times in the timeline are in descending order from later times to earlier times. Below is an example of the data in a simplified timeline named "ITEM" for an item to be constructed.

ITEM

Jan. 1, 1998: Element 1;

Feb. 2, 1998: Element 2;

Mar. 1, 1998: Element 3;

Nov. 1, 1998: Element 4;

Dec. 31, 1998: Element 5.

The item being constructed in the above exemplary timeline includes at least five named elements (i.e., elements 1–5). The timeline specifies that element 1 is to be added to the item on Jan. 1, 1998, element 2 is to be added to the item on Feb. 1, 1998, element 3 is to be added to the item on Mar. 1, 1998, element 4 is to be added to the item on Nov. 1, 1998, and element 5 is to be added on Dec. 31, 1998. In addition to including times representing the construction of an item, the timeline also may include times representing the destruction of an item. Accordingly, the exemplary timeline may represent dates in which elements 1–5 are to be removed from the item.

The item may be anything that is constructed, grown, or otherwise built from one or more elements. More particularly, the item may be modifications to real property, such as a power plant, a playground, or a forest. Alternatively, the item may be personal property, such as an automobile, computer, or stapler. Elements of the item are the component parts that make up the item. For example, elements of an automobile may include the wheels, doors, muffler system, and windshield.

Each of the elements of the item may have two or more associated times on the timeline. In one embodiment of the invention, an item may have elements that are constructed over more than one day (e.g., the foundation of a building). Each such element thus may have a start time, indicating the time that construction of the specified element is to begin, and an end time, indicating the time that construction of the specified element is to be completed. By way of example, the start time and end time may be the same date, or many days apart. In some embodiments of the invention, completed elements are displayed in a different format than elements that are under construction.

FIG. 1 illustrates the system architecture for an exemplary computer system 100, such as an IBM THINKPAD 701® computer (distributed by International Business Machines of Armonk, N.Y.), on which the disclosed system for displaying an item can be implemented. The exemplary computer system of FIG. 1 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 1.

The computer 100 includes a central processing unit (CPU) 105 having a conventional microprocessor, random access memory (RAM) 110 for temporary storage of information, and read only memory (ROM) 115 for permanent storage of read only information. A memory controller 100 is provided for controlling system RAM 110. A bus controller 125 is provided for controlling a bus 130, and an interrupt controller 135 is provided for receiving and processing various interrupt signals from the other system components.

Mass storage may be provided by known non-volatile storage media, such as a diskette 142, a digital versatile disk (not shown), a CD-ROM 147, or a hard disk 152. Data and software may be exchanged with the computer system 100 via removable media, such as the diskette 142 and the CD-ROM 147. The diskette 142 is insertable into a diskette drive 141, which utilizes a diskette drive controller 140 to interface with the bus 130. Similarly, the CD-ROM 147 is insertable into a CD-ROM drive 146, which utilizes a CD-ROM drive controller 145 to interface with the bus 130. Finally, the hard disk 152 is part of a fixed disk drive 151, which utilizes a hard drive controller 150 to interface with the bus 130.

User input to the computer 100 may be provided by a number of devices. For example, a keyboard 156 and a mouse 157 may be connected to the bus 330 by a keyboard and mouse controller 155. An audio transducer 196, which may act as both a microphone and a speaker, is connected to the bus 130 by audio controller 197. It should be obvious to those reasonably skilled in the art that other input devices, such as a pen and/or tablet and a microphone for voice input, may be connected to computer 100 through bus 130 and an appropriate controller. A direct memory access (DMA) controller 160 is provided for performing direct memory access to system RAM 110. A visual display may be generated by a video controller 165, which controls a graphics accelerator 167 and a display device 170. In preferred embodiments, the graphics accelerator is a PANTHER™ video card, available from Intergraph Corporation of Huntsville, Ala. As is known in the art, the PANTHER™ video card is configured for use with the OPENGL™ application program interface ("API") for rendering three dimensional ("3D") images on the display device 170.

A network adapter 190 also may be included to enable the computer system 100 to be interconnected to a network 195 via a network bus 191. The network 195, which may be a local area network (LAN), a wide area network (WAN), or the Internet, may utilize general purpose communication lines that interconnect a plurality of network devices.

The computer system 100 preferably is controlled and coordinated by operating system software, such as the WINDOWS NT® operating system (available from Microsoft Corp., of Redmond, Wash.). Among other computer system control functions, the operating system controls allocation of system resources and performs tasks such as process scheduling, memory management, networking, and I/O services. As suggested above, the operating system preferably includes an OPENGL™ application program interface for rendering non-trivial 3D graphical indicia on the display device 170.

FIG. 2 shows a preferred embodiment of the system 200 for displaying an item as it is to appear at a preselected date in a timeline. Specifically, the system 200 includes a design program 202 for graphically designing an item, its elements, and the relative positions of the elements on the item, and a scheduling program 204 for scheduling and storing times that elements are to be added to or removed from the item (i.e., creating and maintaining the timeline). As discussed in greater detail below, a linker 206 preferably accesses the timeline and controls the design program 202 to display the item on the display device 170 as it is to appear at a preselected time in the timeline.

In preferred embodiments, the design program 202 is the DESIGNREVIEW™ design program. As is known in the art, the DESIGNREVIEW™ design program utilizes the OPENGL™ API to enable an operator of the program ("operator") to design an item in 3D space on the display device 170. Accordingly, each of the elements and their spatial relations in three dimensions may be defined by the preferred design program 202. Among other things, the DESIGNREVIEW™ design program includes an API 208 to facilitate its use by other programs. Many of the functions in the DESIGNREVIEW™ API 208 are described in the September, 1996 edition of the "DesignReview Programmer's Reference Manual", published by Integraph Corporation, the disclosure of which is incorporated herein, in its entirety, by reference.

The scheduling program 204 preferably is the MICROSOFT PROJECT™ 4.1 project planning software, available from Microsoft Corp. As known in the art, such scheduling program 204 enables an operator to create and maintain a timeline in non-volatile memory. As such, an operator may change or add elements within the timeline. In a similar manner, an operator also may change dates that elements are to be added to or removed from an item. A visual display of the timeline is a typical output for such scheduling program 204. For example, the scheduling program 204 may produce a bar graph showing the dates that elements are to be added to an item. In preferred embodiments, the design program 202 utilizes the well known Dynamic Data Exchange interprocess communication protocol ("DDE") to facilitate its use by other programs. Other interprocess communication protocols may be used, however, such as the well known object linking and embedding protocol ("OLE"), developed and distributed by Microsoft Corp.

In alternative embodiments, other scheduling programs 204 may be used instead of the MICROSOFT PROJECT™ 4.1 project planning software. For example, PRIMAVERA PROJECT PLANNER™ 2.0, available from Primavera Systems, Inc. of San Francisco, Calif. may be used. In addition, OPEN PLAN™ 1.2, available from Welcom, Inc. of Houston, Tex. also may be used.

FIG. 3a generally shows a preferred process utilized by the linker 206 for controlling the system 200 to display the item as it is to appear at a preselected time in the timeline. The process begins at step 300 in which a time in the construction or destruction process of the item in the timeline is determined. This may be performed by receiving user input from a graphical user interface, or by other conventional user input mechanism. The process continues to step 302 in which the timeline is accessed in memory by directing a message to the scheduling program via DDE. The timeline may he a record in a database, or an independent data structure within the computer system 100.

Once the timeline is accessed, the linker 206 determines which element(s) are added to or removed from the item on or before the preselected time (step 304). "Added to" may indicate that time that construction of a constructable element is to begin. In a similar manner, "removed from" may indicate the time that destruction of a destructible element is to begin. The times associated with each element may be compared to the preselected time to determine which elements are to be added to or removed from the item on or before the preselected time. When an element is determined to be on or before the preselected time, it is added to a set of items to be displayed ("prior element set"). In some embodiments, a flag is set for each element in the prior element set. In alternative embodiments, a flag is set for each element not in the prior element set.

The process continues to step 306 in which the linker 206 directs a message to the design program 202 to draw the elements that are in the prior element set on the display device 170 in a selected format. The selected format, which may be selected at any time during the process, may be any known format utilized by the design program 202 (e.g., shading the interior of such elements with a solid color).

Once the elements in the prior element set are drawn, it may be determined at step 308 if the remaining elements (i.e., those elements not in the prior element set) are to be drawn in another format that is different than the selected format. Such other format may include drawing the remaining elements in wire frame (i.e., only drawing an outline of such elements), or drawing the remaining element in a semi-transparent manner. When drawing the elements in the latter format, the pixels representing such elements are set to a transparency of about fifty percent.

If it is determined at step 308 that the remaining elements are not to be drawn, then the process ends. This may involve drawing the elements on the display device 170 in a transparent mode (i.e., setting the transparency value to a zero value). Conversely, if it is determined at step 308 that the remaining elements are to be drawn, then the process continues to step 310 in which the format for drawing the remaining elements is to be determined. These formats, which preferably are different than the selected format for the prior element set may include any of those discussed above, or any other formats known in the art. The process then continues to step 312 in which the linker 206 directs a message to the design program 202 to draw the remaining elements in the selected format.

It should be noted that like other steps in the disclosed process shown in FIG. 3a, steps 308–312 may be performed at other points in the process. For example, those steps may be performed between steps 304 and 306.

As should be evident to those skilled in the art, an operator can modify the timeline at virtually any time and still utilize the process shown in FIG. 3a to rapidly display the item as it is to appear at a preselected time. More particularly, modification of the timeline consequently changes the output of the design program 202. Modifications to design plans of the item thus can be implemented and rapidly rendered, consequently improving the efficiency of the construction or destruction process.

Figure 3B:
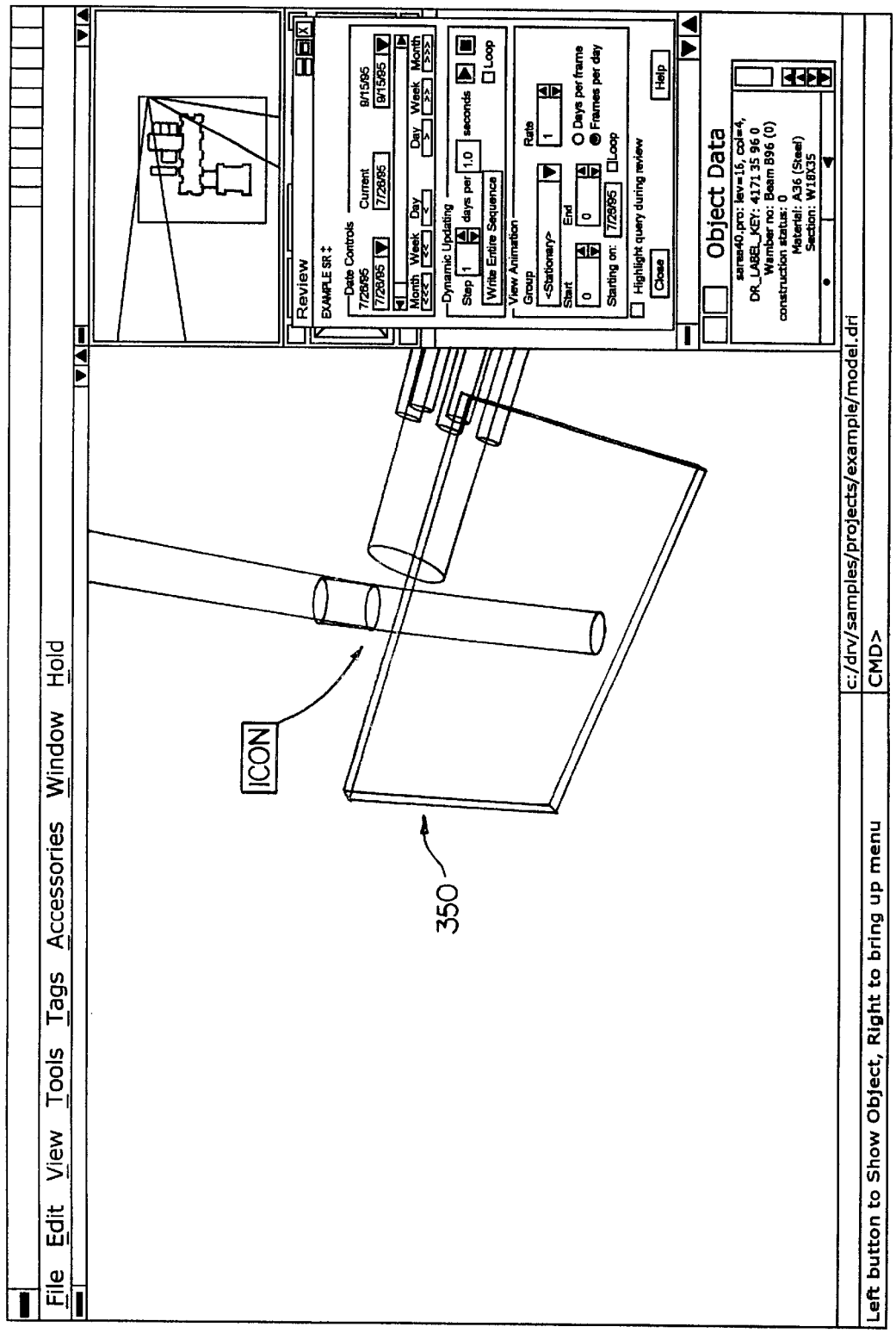
FIGS. 3b and 3c respectively show a display of an exemplary item at an early time and at a subsequent time.
Figure 3C:
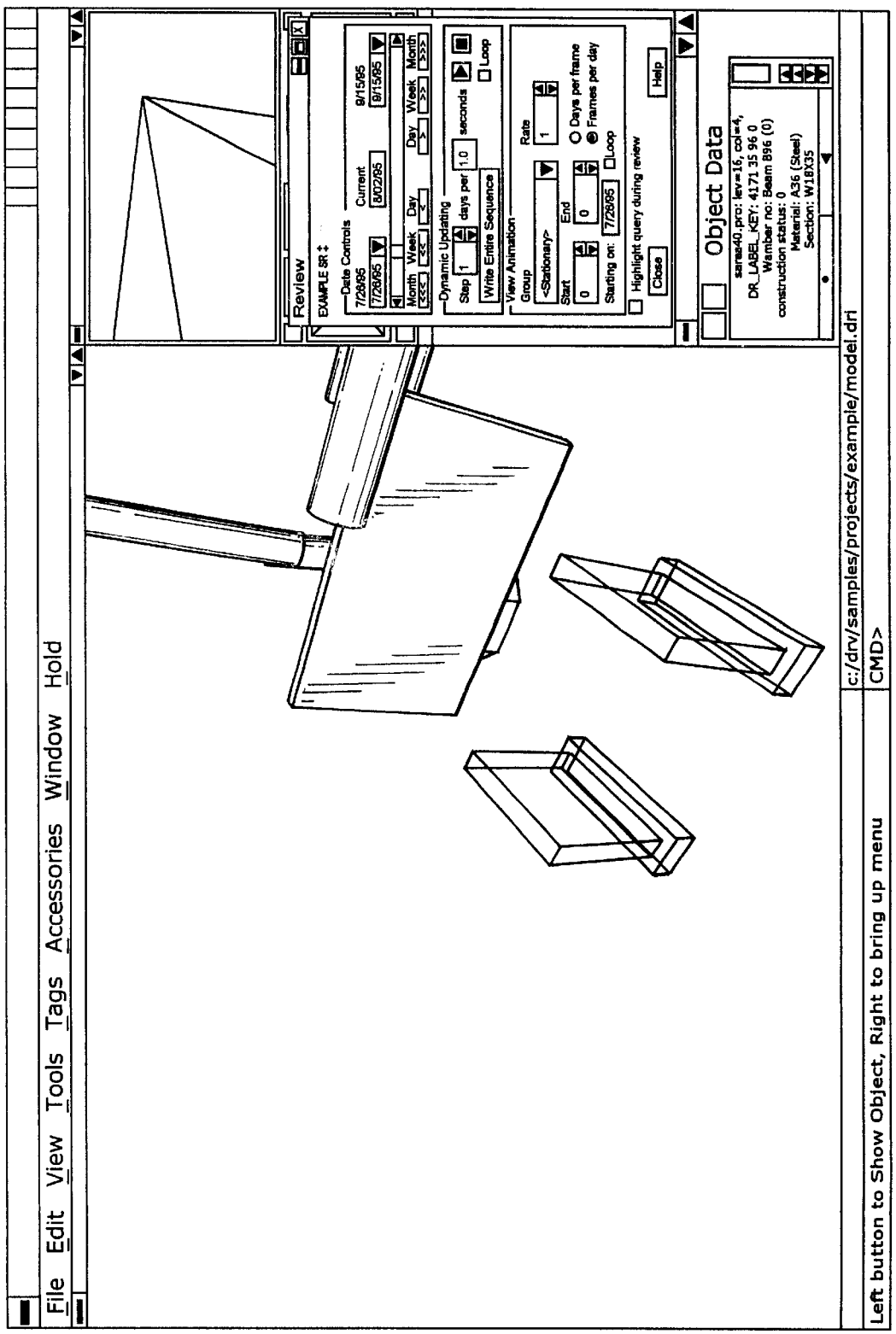

As noted above, each element of an item may have two or more associated times on the timeline such as, for example, the start time and the end time for each element. Elements having a start time before the predetermined time (from step 300) and an end time after the predetermined time may be considered to be "under construction." Accordingly in some embodiments of the invention, elements under construction may be displayed in a first format (e.g., wire frame) while elements having both start and end times before or at the predetermined time are displayed in a second format (e.g., solid shading). Elements that have both start and end times after the predetermined time may be displayed in a third format (e.g., transparent or partially transparent). The linker 206 can utilize the process shown in FIG. 3a to determine which of the different formats that each element is to be drawn. When utilizing such process, the linker 206 may access the timeline to determine which elements are under construction, which elements are completed, and which elements are neither completed nor under construction. The linker 206 then may control the design program 202 to draw the elements appropriate formats. FIGS. 3b and 3c show an exemplary item at an early time and at a subsequent time. In FIG. 3b, each of the displayed elements are in wire frame 350 since those elements are to be under construction at the early time. Elements not shown are neither under construction nor completed at that time. In FIG. 3c, the elements of the item that were in wire frame 350 in FIG. 3b are shaded, thus indicating that those elements are to be fully constructed and added to the item at the subsequent time. Additional wire frame elements are shown in FIG. 3c, thus indicating that those elements are under construction at the subsequent time.

In accordance with other embodiments of the invention, the linker 206 may be configured to identify elements of an item that share a common attribute, and then control the design program 202 to display those elements in a common format. For example, in response to a request by the operator, the linker 206 may display all elements manufactured from steel in a selected format (i.e., display all such elements in solid blue). Among other things, common attributes may be based upon common date of installation of the elements, element materials, vendors/manufacturers of the elements, element costs (e.g., all elements that cost greater than $1,000), and function of the elements.

Figure 4:
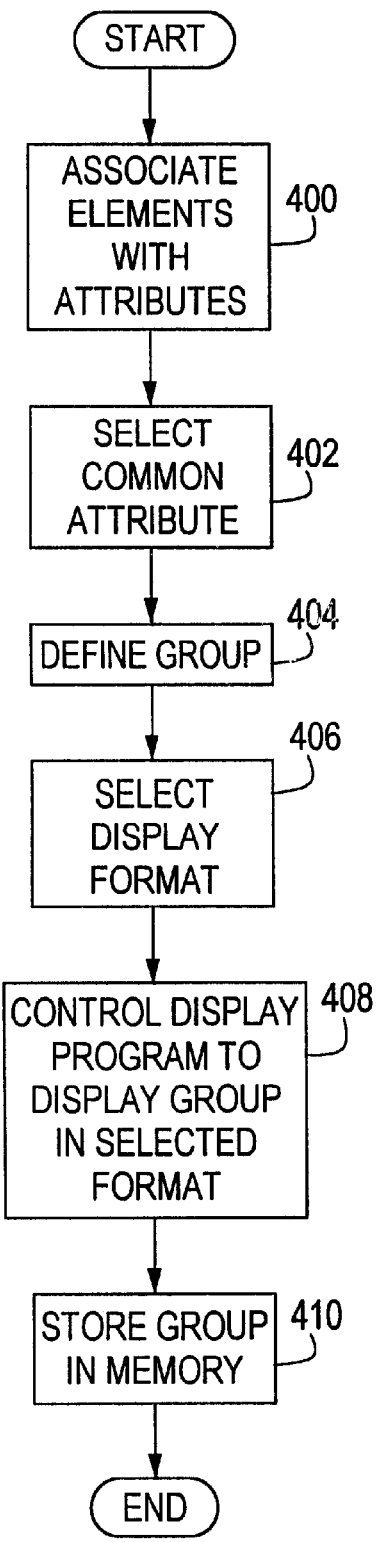
FIG. 4 shows a preferred process for controlling the system shown in FIG. 2 for displaying elements having a common attribute in a common format.

FIG. 4 shows a preferred process for controlling the system 200 to display elements having a common attribute in a common format. The process begins at step 400 in which attributes are assigned to elements. This may be performed by displaying a graphical user interlace that enables an operator to select an element and assign one or more attributes to it. Since each of the elements preferably are defined in a database associated with the project program, the defined attributes preferably are stored in such database when one is assigned. Attributes may he assigned, removed, and/or edited at any time. It is preferred, however, that the attributes for each element be assigned as the item is initially designed.

The process continues to step 402 in which a common attribute is selected. A graphical user interlace may be displayed for the operator to select such attribute. In some embodiments, boolean operators such as "AND" and "OR" may be utilized to combine common attributes.

At step 404, a display group is defined that has the common attribute(s) selected in step 402. A display format then may be selected, via a graphical user interface, for displaying the elements in the display group. Alternatively, the display format may be preconfigured to be a default format. The design program 202 then is controlled by the linker 206 to display the elements in the display group in the selected display format.

The process then continues to step 410 in which information identifying the elements in the display group is stored in memory. A name may be assigned to the display group to identify it for subsequent use. Accordingly, at some subsequent time, an operator may access the already defined display group and display it in a selected format. A plurality of selected display groups may be stored in memory for these purposes.

In accordance with preferred embodiments of the invention, the system 200 also may enable an operator to graphically associate a file in the computer system 100 with any element or group of elements in the item. More particularly, an icon representing the file may be located near the element and/or have a line connecting the icon with the element. In preferred embodiments, the icon has a depth coordinate.

Figure 5:
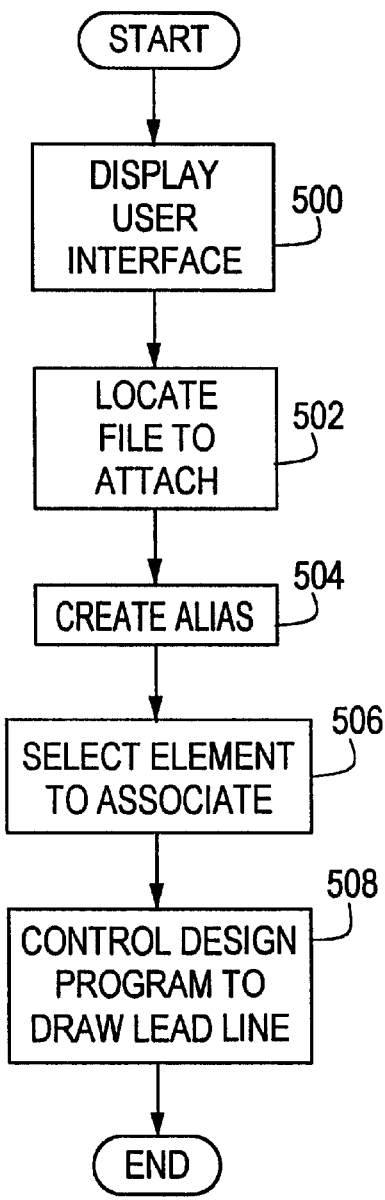
FIG. 5 shows a preferred processes for graphically associating a file with an element in an item.

FIG. 5 shows a preferred processes for graphically associating a file with an element in the item. The process begins at step 500 in which a user interface is displayed having a field for locating a file in the computer system 100. The file may be any type of file such as, for example, a word processing file, a graphic image file, a spread sheet file, or a video file. Once selected, the linker 206 locates the file to attach to an element in accord with conventional processes (step 502). The process continues to step 504 in which an alias icon is created. The element to associate with the alias icon also may be selected at any time during this process via a graphical user interface or other conventional means (step 506).

The linker 206 then directs a message to the design program 202 to draw the icon near the element, and then draw a lead line from the icon to the element (step 508). The message may include functions in the design program API that cause the design program 202 to display the icon and accompanying lead line in the desired manner on the display device 170. Subsequent selection of the icon by a pointing device consequently launches the application program associated with the file, thus enabling operator use of the file. Accordingly, an operator may write word processing document listing the specifications of an element and then, graphically link that document to the associated element. A subsequent system operator then may quickly and easily retrieve the specifications of such part merely by selecting the icon.

Identifying indicia also can be graphically displayed near an element to identify such element. To that end, a graphic tag having text or other indicia may be visually connected to an associated element via a lead line. A graphical user interface may be utilized enabling an operator to create and/or edit tags.

Figure 6:
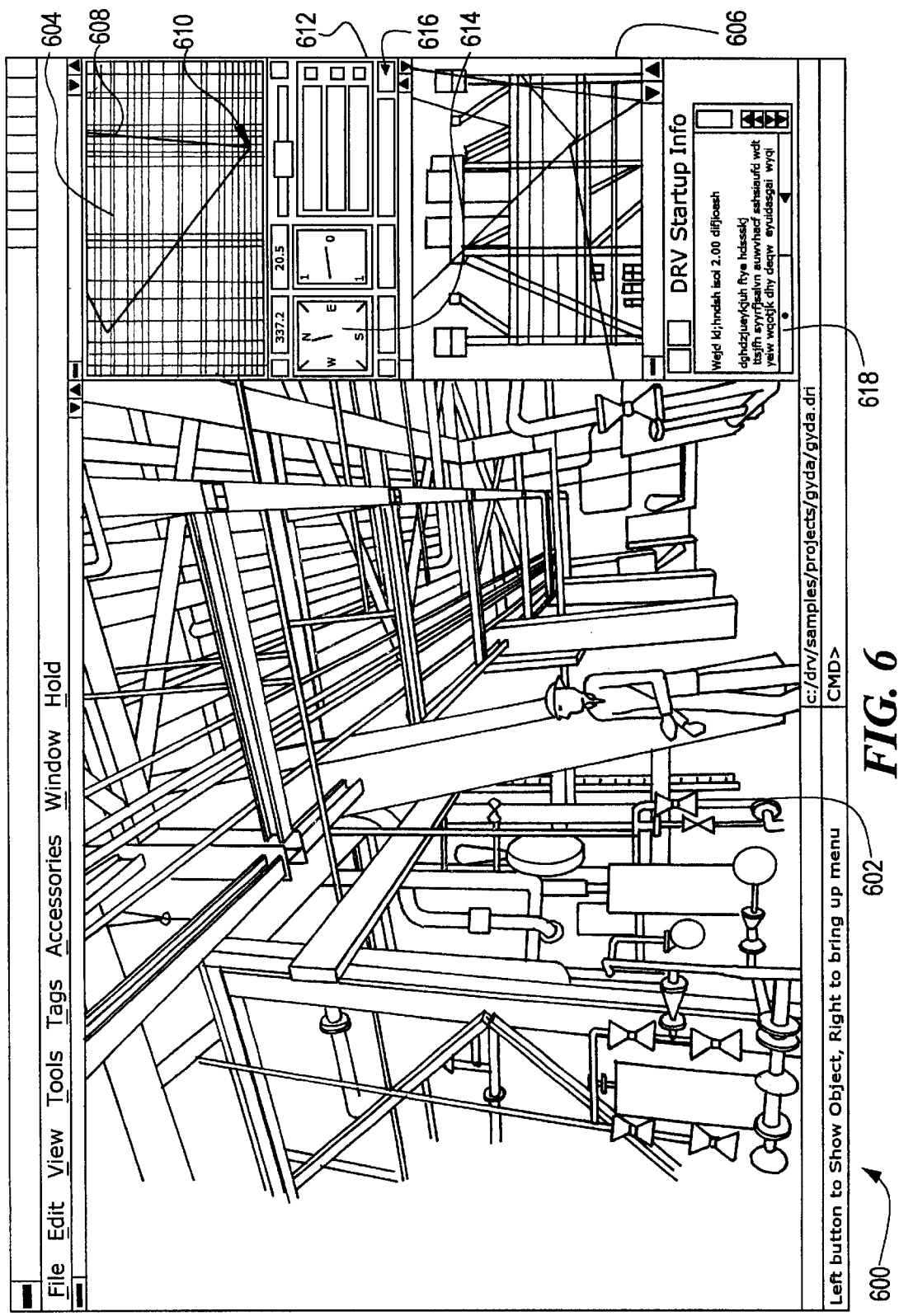
FIG. 6 shows an exemplary display produced by the design program when utilized with a preferred embodiment of the invention.

FIG. 6 shows an exemplary display 600 produced by the design program 202 when utilized with a preferred embodiment of the invention. The display 600 preferably includes five separate but related windows. A first window 602 is a perspective view of the item, a second window 604 is a plan (top) view of the item, and a third window 606 is an elevational (side) view of the item. The perspective view preferably shows the item as it is to appear at a selected time in accord with preferred embodiments of the invention. Both the plan view and elevational view preferably include a viewcone 608 that together show the view of the item that is displayed by the perspective view. More particularly, the viewcone 608 simulates the view of a person actually viewing the item. The viewcone 608 therefore preferably includes a pair of diverging lines that intersect at an apex 610 representing the location of a person viewing the item.

An operator may navigate about the item by means of a navigation window 612 on the exemplary display 600. This window is particularly useful when the item is a real property such as, for example, a power plant. In preferred embodiments, the navigation window 612 includes a plurality of fields that facilitate item navigation. Among other fields, the navigation window 612 may have a compass 614 indicating the direction of travel through the item, and an step size field 616 showing the size of steps that an operator is virtually stepping through the item (if the item is large enough).

Information relating to a selected element may be displayed in an information window 618. In accordance with preferred embodiments of the invention, selection of an element causes information relating to that item to be displayed in the information window 618. To that end, an operator may create a text file associated with an element, and then link such file, via software, to such element. Accordingly, selection of the element on the display device 170 (e.g., via double clicking on the element) causes the linker 206 to retrieve the file in memory. Once retrieved, an underlying text application program is launched, thus displaying the textual information in the information window 618. In alternative embodiments, an element may be selected merely by dragging a pointer over the element and not clicking a mouse.

Figure 7:
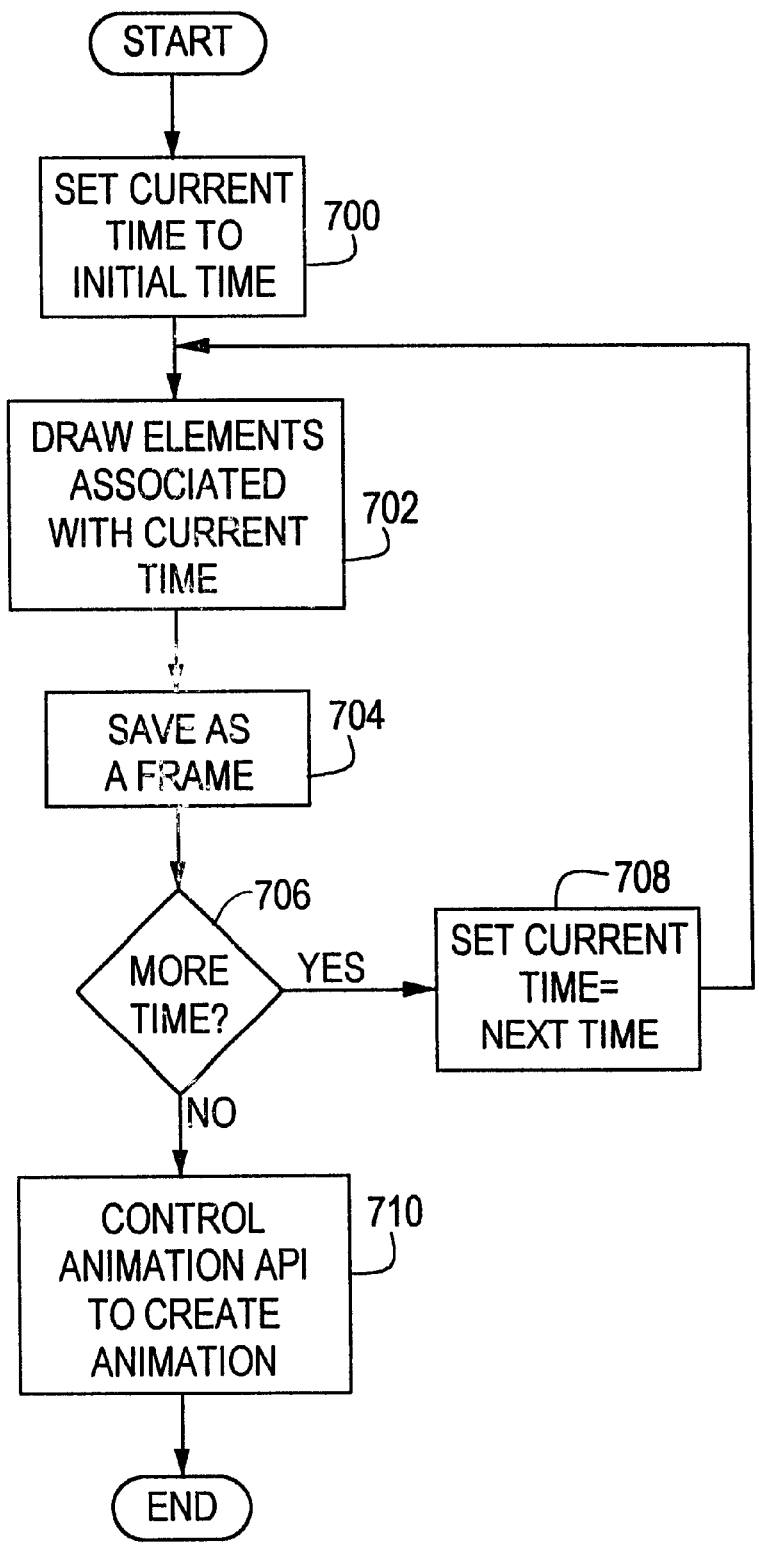
FIG. 7 shows a preferred process of creating an animation of the construction or destruction of an item.

In some embodiments of the invention, the progression of the construction or destruction process may be animated by means of an animation API that is a part of the design program API 208. FIG. 7 shows a preferred process of creating an animation of the construction or destruction of an item. The process begins at step 700 in which a "current time" variable is initialized to be the initial time in the timeline. At step 702, the elements to be added to or removed from the item at the current time then are drawn to a file in memory by the design program 202. Once drawn, the file is saved as a frame (step 704). The process then moves to step 706 in which it is determined if the timeline has additional times that are subsequent to the current time. If there are such times, then the process moves to step 708 in which the current time variable is set to be the next subsequent time in the timeline. The process then loops back to step 702.

It at step 706 it is determined that there are no subsequent times, then the process moves to step 710 in which the linker 206 controls the design program (via the API 208) to create an animation of the construction or destruction of the item. The animation is created in accordance with conventional processes and preferably stored as an ".AVI" file in the non-volatile memory.

When using design programs 202 like the above noted MICROSOFT PROJECT™ 4.1 project software, an operator may traverse through the item, via the perspective view window, by moving the mouse. In other embodiments, a predefined animation of the item may be created simulating a person's traversal through the item.

The linker 206 may be implemented as a computer program written in any one of many well known programming languages. Among other types, such programming languages may be either procedural languages (e.g., FORTRAN), or object oriented languages (e.g., C++). In preferred embodiments, the linker 206 is implemented in the DELPHI™ programming language and is a plug-in component to the design program 202.

In an alternative embodiment, the disclosed graphical system 200 may be implemented as a computer program product for use with a computer system 100. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A computer program product for use on a computer system for graphically displaying an item on a display device as the item appears at a preselected time in a timeline, the item having a plurality of elements, each of the elements having an associated time in the timeline, the computer program product comprising a computer usable medium having computer readable program code thereon, the computer readable program code including:

program code for determining which of the plurality of elements that are later in the timeline than the preselected time:

program code for defining first and second sets of elements, the elements in the first set of elements each having a respective associated time that is no later than the preselected time, the elements in the second set of elements each having the elements not in the first set of elements;

program code for drawing the elements in the first set in a first format on the display device; and program code for drawing the elements in the second set in a second format on the display device, the second format graphically indicating that the elements in the second set have respective times that each are later than the preselected time.

2. The computer program product as defined b claim 1 wherein the elements in the second set are transparent.

3. The computer program product as defined by claim 1 wherein the elements in the second set are in wire frame.

4. The computer program product as defined by claim 1 wherein the elements in the first set are in a first color and further wherein the elements in the second set are drawn in a second color, the first color being different from the second color.

5. The computer program product as defined by claim 1 further including:

program code for displaying a user input message requesting the preselected time.

6. The computer program product as defined by claim 1 wherein the program code for determining includes:

program code for accessing a data storage medium having the timeline.

7. The computer program product as defined by claim 1 further including:

program code for displaying a user viewpoint on the display device.

8. The computer program product as defined by claim 1 further including program code or simultaneously displaying a first window having a first view of the item, a second window having a second view of the item, and a third window having a third view of the item.

9. The computer program product as defined by claim 8 wherein the first view is a plan view, the second view is a perspective view, and the third view is an elevational view.

10. The computer program product as defined by claim 1 further including:

program code for graphically associating a document with at least one of the elements of the item.

11. The computer program product as defined by claim 10 wherein the program code for associating includes:

program code for displaying an icon representing the document; and program code for graphically connecting the icon to the element associated with the document.

12. The computer program product as defined by claim 11 further including:

program code for executing an application program in response to selection of the icon.

13. The computer program product as defined by claim 1 wherein each of the elements in the item have attributes, the computer program product further comprising:

program code for selecting an attribute;

program code for defining a third set of elements having the selected attribute; and program code for displaying the elements in the third set of elements in a third format.

14. The computer program product as defined by claim 13 wherein the third format includes displaying the elements in the third set in a preselected color.

15. An apparatus for graphically displaying an item on a display device as the item appears at a preselected time in a timeline, the item having a plurality of elements, each of the elements having, an associated time in the timeline the apparatus comprising:

means for determining which of the plurality of elements that are later in the timeline than the preselected time;

means for defining first and second sets of elements, the elements in the first set of elements each having a respective associated time that is no later than the preselected time, the elements in the second set of elements each having the elements not in the first set of elements;

means for drawing the elements in the first set in a first format on the display device; and means for drawing the elements in the second set in a second format on the display device, the second format graphically indicating that the elements in the second set have respective times that each are later than the preselected time.

16. The apparatus as defined by claim 15 wherein the elements in the second set are transparent.

17. The apparatus as defined by claim 15 wherein the elements in the second set are in wire frame.

18. The apparatus as defined by claim 15 wherein the elements in the first set are in a first color, and further wherein the elements in the second set are drawn in a second color, the first color being different from the second color.

19. The apparatus as defined by claim 15 further including:

means for displaying a user input message requesting the preselected time.

20. The apparatus as defined by claim 15 wherein the means for determining includes:

means for accessing a data storage medium having the timeline.

21. The apparatus as defined by claim 15 further including means for simultaneously displaying a first window having a first view or the item, a second window having a second view of the item, and a third window having a third view of the item.

22. The apparatus as defined by claim 21 wherein the first view is a plan view, the second view is a perspective view, and the third view is an elevational view.

23. The apparatus as defined by claim 15 further including:

means for graphically associating a document with at least one of the elements of the item.

24. The apparatus as defined by claim 23 wherein the means for associating includes:

means for displaying an icon representing, the document; and means for graphically connecting the icon to the element associated with the document.

25. The apparatus as defined by claim 24 further including:

means for executing an application program in response to selection of the icon.

26. A method of graphically displaying an item on a display device as the item appears at a preselected time in a timeline, the item having a plurality of elements, each of the elements having an associated time in the timeline, the method comprising the steps of:

determining which of the plurality of elements that are later in the timeline than the preselected time;

defining first and second sets of elements, the elements in the first set of elements each having a respective associated time that is no later than the preselected time, the elements in the second set of elements each having the elements not in the first set of elements;

drawing the elements in the first set in a first format on the display device; and drawing the elements in the second set in a second format on the display device, the second format graphically indicating that the elements in the second set have respective times that each are later than the preselected time.

27. The method as defined by claim 26 wherein the elements in the second set are transparent.

28. The method as defined by claim 26 wherein the elements in the second set are in wire frame.

29. The method as defined by claim 26 wherein the elements in the first set are in a first color, and further wherein the elements in the second set are drawn in a second color, the first color being different from the second color.

30. The method as defined by claim 26 further including the step of:
displaying a user input message requesting the preselected time.

31. The method as defined by claim 26 wherein the step of determining includes the step of:
accessing a data storage medium having the timeline.

32. The method as defined by claim 26 wherein the display device simultaneously displays a first window having a first view of the item, a second window having a second view of the item, and a third window having a third view of the item.

33. The method as defined by claim 32 wherein the first view is a plan view, the second view is a perspective view, and the third view is an elevational view.

34. The method as defined by claim 26 further including the step of:
graphically associating a document with at least one of the elements of the item.

35. The method as defined by claim 34 wherein the step of associating includes the steps of:
displaying an icon representing the document; and
graphically connecting the icon to the element associated with the document.

36. The method as defined by claim 35 further including the step of:
executing an application program in response to selection of the icon.

37. The method as defined by claim 26 wherein the item is drawn in 3D.

38. The method as defined by claim 26 wherein each of the elements in the item have attributes, the method further comprising the steps of:
selecting an attribute;
defining a third set of elements having the selected attribute; and
displaying the elements in the third set of elements in a third format.

39. The method as defined by claim 36 wherein the third format includes displaying the elements in the third set in a preselected color.

40. The method as defined by claim 26 wherein each element in the first set of elements has a start time that is no later than the preselected time.

41. A system for displaying an item as it is to appear at a preselected time, the item having a plurality of elements, the system comprising:
a scheduler for managing a timeline having an associated time for each element, the associated time for each element being the time that each element is to be added to the item;
a designer for drawing the item in a three-dimensional space on a display device, the designer defining the spatial relationship of each of the elements of the item; and
a linker for accessing the timeline and responsively controlling the designer to draw each of the elements that have an associated time that is no later than a preselected time.

42. The system as defined by claim 41 further comprising:
an animator for accessing the timeline and responsively controlling the designer to draw a motion picture of the item between first and second selected times.

43. The system as defined by claim 42 wherein the first selected time is earlier than the second selected time.

44. The system as defined by claim 42 wherein the first selected time is later than the second selected time.

45. A computer program product for use on a computer system for displaying an item as it is to appear at a preselected time, the item having a plurality of elements, the computer program product comprising a computer usable medium having computer readable program code thereon, the computer readable program code including:
program code for managing a timeline having an associated time for each element, the associated time for each element being the time that each element is to be added to the item;
program code for drawing the item in a three-dimensional space on a display device, the program code for drawing defining the spatial relationship of each of the elements of the item; and
program code for accessing the timeline and responsively utilizing the program code for drawing, to draw to draw each of the elements that have an associated time that is no later than a preselected time.

46. The computer program product as defined by claim 45 further comprising:
program code for accessing the timeline and responsively controlling the program code for drawing to draw a motion picture of the item between first and second selected times.

47. The computer program product as defined by claim 45 wherein each of the elements in the item have attributes, the computer program product further comprising:
program code for selecting an attribute; and
program code for controlling the program code for drawing to display each of the elements having the attribute in a preselected format, the preselected format being different than a format used by those elements that do not have the attribute.

48. A computer program product for use on a computer system for displaying an item as it is to appear at a preselected time, the item having a plurality of elements that each have a start time and an end time, the computer program product comprising a computer usable medium having computer readable program code thereon, the computer readable program code including:
program code for managing a timeline having the start time and end time for each element;
program code for drawing the item in a three-dimensional space on a display device, the program code for drawing defining the spatial relationship of each of the elements of the item; and
program code for accessing the timeline and responsively utilizing the program code for drawing to draw each of the elements having a start time that is no later than a preselected time.

49. The computer program product as defined by claim 48 wherein each element having a start time that is no later than a preselected time are members of a first set, the program code for accessing includes:

program code for adding to a second set each element in the first set having an end time that is later than the preselected time;

program code for utilizing the program code for drawing to draw in a first format each element in the first set that is not in the second set; and program code for utilizing the program code for drawing to draw in a second format each element in the second set, the first format being different than the second format.

50. A system for displaying an item as it is to appear at a preselected time, the item having a plurality of elements that each have a start time and an end time, the system comprising:

a manager for managing a timeline having the start time and end time for each element, a displayer for drawing the item in a three-dimensional space on a display device, the displayer defining the spatial relationship of each of the elements of the item; and a linker for accessing the timeline and responsively controlling the displayer to draw each of the elements having a start time that is no later than a preselected time.

51. The system as defined by claim 50 wherein each element having a start time that is no later than a preselected time are members of a first set, the linker including:

means for adding to a second set each element in the first set having an end time that is later than the preselected time;

means for controlling the displayer to draw in a first format each element in the first set that is not in the second set; and means for controlling the displayer to draw in a second format each element in the second set, the first format being different than the second format.

* * * * *

UNITED STATES PATENT AND TRADEMARK OFFICE
CERTIFICATE OF CORRECTION

PATENT NO.    : 6,392,651 B1
DATED         : May 21, 2002
INVENTOR(S)   : David J. Stradley It is certified that error appears in the above-identified patent and that said Letters Patent is hereby corrected as shown below:

Column 11,
Line 3, change "b" to -- by --
Line 25, change "or" to -- for --
Line 60, delete "," after "having"
Line 60, insert -- , -- after "timeline"

Column 12,
Line 42, delete "," after "representing"

Column 14,
Line 28, delete "," after "drawing"
Line 28, delete "to draw" after "to draw"

Signed and Sealed this

Twenty-ninth Day of June, 2004

JON W. DUDAS
*Acting Director of the United States Patent and Trademark Office*